No. 764,496. PATENTED JULY 5, 1904.
C. C. OVERTON.
COOKING DEVICE.
APPLICATION FILED FEB. 10, 1904.
NO MODEL.
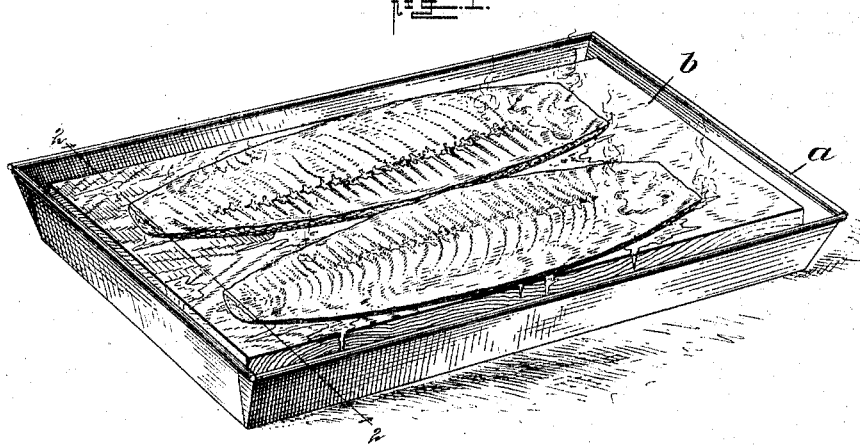
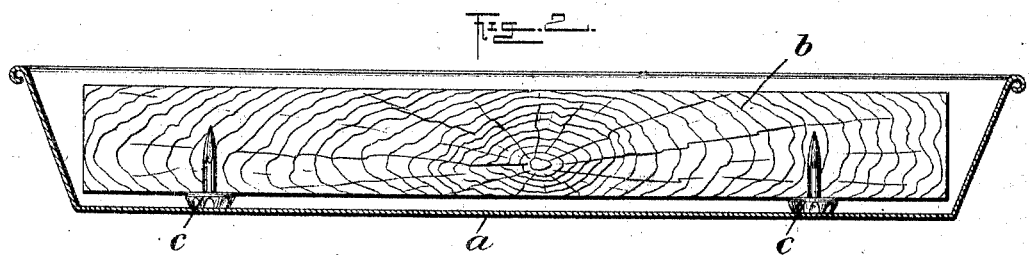
WITNESSES:
INVENTOR
Charles C. Overton
BY
ATTORNEYS No. 764,496.  
Patented July 5, 1904.

UNITED STATES PATENT OFFICE.

CHARLES C. OVERTON, OF NEW YORK, N. Y.

COOKING DEVICE.

SPECIFICATION forming part of Letters Patent No. 764,496, dated July 5, 1904.

Application filed February 10, 1904. Serial No. 192,891. (No model.)

*To all whom it may concern:*

Be it known that I, CHARLES C. OVERTON, a citizen of the United States, and a resident of the city of New York, Coney Island, borough of Brooklyn, in the county of Kings and State of New York, have invented a new and Improved Cooking Device, of which the following is a full, clear, and exact description.

This invention relates to an improved device for cooking meats, fish, and the like in the oven of a stove and at the same time imparting thereto the peculiarly delicate flavor of meats and fish cooked after what is commonly termed the "planking" process.

This specification is an exact description of one example of my invention, while the claims define the actual scope thereof.

Reference is to be had to the accompanying drawings, forming a part of this specification, in which similar characters of reference indicate corresponding parts in both the views.

Figure 1 is a perspective view showing the invention in use, and Fig. 2 is a section on the line 2 2 of Fig. 1.

$a$ indicates the receptacle, which may be of any suitable material and of any desired shape, but is preferably in the form of a shallow pan. $b$ indicates the plank-section, which is formed of wood and to attain the best results should be of oak or equivalent woods which are known to impart peculiarly fine flavors to the food cooked thereon. I provide means for supporting the plank-section $b$ above the bottom surface of the receptacle $a$. As here shown, these means comprise nails $c$, driven into the bottom of the plank and having enlarged heads bearing on the bottom of the receptacle $a$; but I may in practice provide supporting means for the plank on the inner surface of the bottom of the receptacle.

In the use of the invention the plank is placed in the receptacle, as shown, and the food is placed on the plank and the whole introduced into the oven. The devices for supporting the plank above the bottom of the receptacle $a$ are provided in order that the essence or gravy flowing from the food may be collected on the bottom of the receptacle completely below the plank, so that the gravy may not be absorbed in the plank, but may be free to be run off from the receptacle $a$ by tilting the same and subsequently applied to the food to baste or moisten the same, as is common in the art of cooking. Further, by supporting the plank above the bottom of the receptacle $a$ direct contact between the plank and the heated receptacle is avoided, thus avoiding the possible burning or scorching of the plank, which is in all instances detrimental to the flavor of the food.

Having thus described my invention, I claim as new and desire to secure by Letters Patent—

1. A cooking device, comprising a receptacle, a plank arranged therein, and projections on the under face of the plank for supporting the plank on the bottom of the receptacle above the same.

2. A cooking device, comprising a receptacle, a plank arranged therein, and means for supporting the bottom of the plank above the bottom of said receptacle, said means comprising nails driven into the bottom of the plank and having their heads engaged with the said receptacle.

In testimony whereof I have signed my name to this specification in the presence of two subscribing witnesses.

CHARLES C. OVERTON.

Witnesses:
F. W. HANAFORD,
EVERARD BOLTON MARSHALL.